United States Patent [19]

Bohman

[11] 4,371,179

[45] Feb. 1, 1983

[54] T-SHAPED SEALING RING WITH ELONGATED LIP

[76] Inventor: Nils-Erik Bohman, Lillegård, Fänestad, Forsheda, Sweden

[21] Appl. No.: 262,805

[22] Filed: May 12, 1981

[30] Foreign Application Priority Data

May 23, 1980 [SE] Sweden .............................. 8003870

[51] Int. Cl.³ .............................................. F16J 15/32
[52] U.S. Cl. ................................ 277/207 A; 277/165; 277/208; 285/110; 285/231; 285/345
[58] Field of Search ....... 277/207 R, 207 A, 208–210, 277/165; 285/110, 230, 231, 232, 235, 237, 345

[56] References Cited

U.S. PATENT DOCUMENTS

| | | | |
|---|---|---|---|
| 3,368,830 | 2/1968 | French | 285/110 |
| 3,510,139 | 5/1970 | Potter | 277/207 B X |
| 3,520,047 | 7/1970 | Muhlner et al. | 285/231 X |
| 3,592,491 | 7/1971 | Glover | 285/345 X |
| 3,684,317 | 8/1972 | Kazienko et al. | 285/110 |

Primary Examiner—Robert S. Ward, Jr.
Attorney, Agent, or Firm—Holman & Stern

[57] ABSTRACT

A sealing ring for sealing the space between two substantially cylindrical, concentric surfaces, as for example, the outer surface of a spigot end of a pipe and the inner surface of a socket.

The sealing ring comprises a main portion adapted sealingly to engage one of the surfaces and a sealing lip projecting from said main portion. The sealing lip is adapted to engage the other of said surfaces while being deflected against the main portion.

The main portion includes a projecting engagement part which is engaged by the free end portion of the sealing lip when the sealing lip is deflected against the main portion.

5 Claims, 2 Drawing Figures

T-SHAPED SEALING RING WITH ELONGATED LIP

BACKGROUND OF THE INVENTION

1. Field of the Invention

The present invention relates to a sealing ring for sealing the space between two substantially cylindrical, concentric surfaces, for example the outer surface of a spigot end of a pipe and the inner surface of a socket.

2. Description of the Prior Art

A previously known sealing ring of this type comprises a main portion which is adapted sealingly to engage one of the surfaces and a sealing lip, which projects from the main portion and is adapted to engage the other of the two surfaces while being deflected against the main portion. Thereby, the sealing ring is usually of T-shaped cross-sectional shape, the sealing lip being constituted by the web portion of the T-shaped section.

In its active sealing position in the space between the two concentric surfaces the sealing lip is compressed between the main portion of the sealing ring and the other surface, so that the sealing ring defines a portion which is compressed between said surfaces.

A sealing ring of the type described above has proved to be advantageous from the point of view that it constitutes a lip sealing ring as well as a compression sealing ring. Thereby, the sealing ring provides a seal with respect to pressures on both sides of the sealing ring. The sealing ring described above has disadvantages attributable to the fact that the force required for mounting the joint which includes a sealing ring is inconveniently great.

SUMMARY OF THE INVENTION

Therefore, the object of the present invention is to provide a sealing ring of the type described above in which the drawback with regard to the great mounting force has been obviated.

In order to comply with this object, the sealing ring according to the invention comprises a main portion provided with a projecting engagement part which is adapted to be engaged by the free end portion of the sealing lip when the sealing lip is deflected against the main portion.

In a sealing ring according to the invention there is provided a greater length of the sealing lip while maintaining the desired compression of the sealing ring, which in turn provides for an easier deflection of the sealing lip so that the sealing ring provides less resistance when mounting the joint in which the sealing ring is included.

In a preferred embodiment of the invention the part of the main portion which is opposite to the sealing lip and is adapted to engage the first surface is formed with a peripheral groove.

BRIEF DESCRIPTION OF THE DRAWINGS

The invention is described in the following disclosure with reference to the accompanying drawing.

DESCRIPTION OF THE PREFERRED EMBODIMENTS

Figure 1:
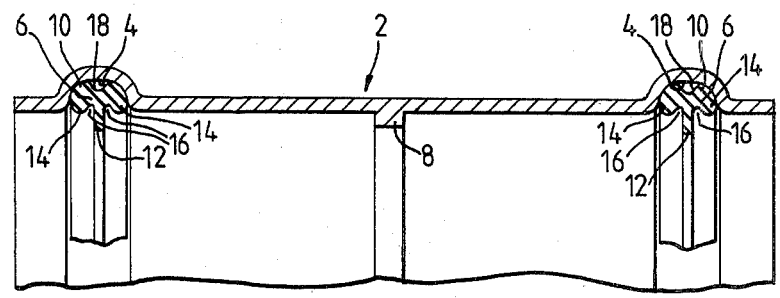
FIG. 1 is an axial section of a part of a pipe socket provided with a sealing ring according to the invention.

In FIG. 1 there is shown a section of a wall of pipe socket 2, which is intended for connecting two pipe ends with each other. At its end, portions the socket 2 is formed with grooves 4 for receiving sealing rings 6 according to the invention. At its central portion the socket 2 has an annular projection 8 adapted to restrict the introduction of the pipe end portions in the socket. Each sealing ring 6 comprises a main portion 10 received in the grooves. An inwardly projecting, annular sealing lip 12 is connected with the main portion 10 at the central plane thereof. At its edge portions the main portion 10 is provided with annular projections 14 constituting, together with the part of the sealing lip 12 adjacent the main portion, annular grooves 16 between the projections 14 and the sealing lip 12.

The main portion 10 is formed with a peripheral groove 18 at the surface thereof which is opposite to the bottom of the groove 4.

Figure 2:
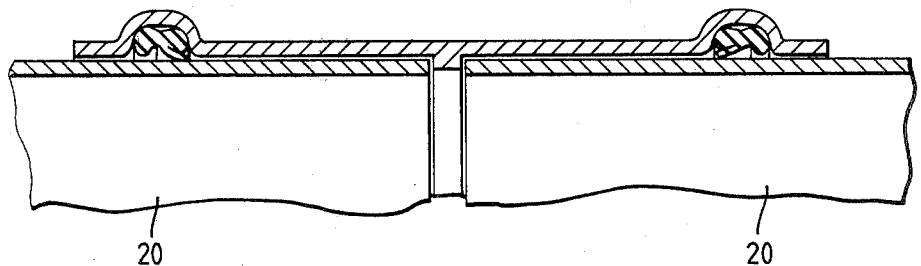
FIG. 2 is an axial section corresponding to FIG. 1, wherein the spigot end of a pipe has been introduced in the socket for constituting a pipe joint.

The pipe socket 2 shown in FIG. 1 is intended to be used for connecting two pipe end portions 20 with each other. The pipe end portions 20 are introduced into the pipe socket 2 in their axial direction. When the pipe end portions 20 engage the sealing lips 12 of the sealing rings 6 the sealing lips are deflected inwards to the position shown in FIG. 2, wherein the free end portions of the sealing lips 12 engage the inner, annular projections 14. Thus, the free end portions of the sealing lips 12 are in this position compressed between the outer surfaces of the pipe end portions 20 and the inner projections 14 of the sealing rings 2. Thereby, the sealing ring forms a combined compression and lip sealing ring which provides a sealing effect irrespective of whether the pressure outside or inside the socket is the higher.

Due to the described design of the sealing ring according to the invention the projections 14 according to the invention provide for a high compression combined with such a great length of the sealing lip 12 which makes it easy to deflect the lip and thereby gives a relatively small resistance against deflection. Thus, when using a sealing ring according to the invention there is obtained a high compression and thereby a good tightness in combination with a small mounting force.

When mounting a pipe joint in which the sealing ring according to the invention is included there is obtained a collecting of dirt, which has been scraped off the outer surface of the pipe end portion 20, in the outer groove 16 which is a further advantage of the sealing ring according to the invention.

The invention can be modified within the scope of the following claims.

I claim:

1. A sealing ring for forming a seal between two substantially cylindrical surfaces, comprising:
    an annular main portion having two radial faces, one of the radial faces adapted to engage one of the cylindrical surfaces and the other radial face having a pair of spaced apart annular grooves;
    a pair of annular engaging portions extending radially from the other radial face of said annular main portion, each of said annular engaging portions located outwardly of each of the grooves; and
    an elongated sealing lip projecting radially from the other radial face of said annular main portion, intermediate and parallel to the pair of grooves, a free end portion of said elongated sealing lip adapted to engage one of said annular portions when deflected and compressed by the other cylindrical surface.

2. A sealing ring as claimed in claim 1, wherein each of the grooves is contiguous to each of said annular engaging portions and said elongated sealing lip.

3. A sealing ring as claimed in claim 1, wherein the length of said elongated sealing lip is greater than said annular engaging portions, measured in the radial direction.

4. A sealing ring as claimed in claim 1, wherein said sealing ring has a substantially T-shaped cross-section.

5. A sealing ring as claimed in claim 4, wherein the part of the main portion of the sealing ring adapted to engage said one surface is formed with an annular groove.

* * * * *